(12) United States Patent
Ling et al.

(10) Patent No.: US 10,632,919 B2
(45) Date of Patent: Apr. 28, 2020

(54) VEHICLE HITCH ASSIST SYSTEM

(71) Applicant: Ford Global Technologies, LLC, Dearborn, MI (US)

(72) Inventors: Yu Ling, Ann Arbor, MI (US); Chen Zhang, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/020,177

(22) Filed: Jun. 27, 2018

(65) Prior Publication Data

US 2020/0001790 A1   Jan. 2, 2020

(51) Int. Cl.
*B60R 1/00* (2006.01)
*B62D 15/02* (2006.01)

(52) U.S. Cl.
CPC .......... *B60R 1/003* (2013.01); *B62D 15/0275* (2013.01); *B60R 2300/207* (2013.01); *B60R 2300/301* (2013.01); *B60R 2300/808* (2013.01)

(58) Field of Classification Search
CPC . B60D 1/36; B60R 1/00; H04N 7/183; G06K 9/52
See application file for complete search history.

(56) References Cited

U.S. PATENT DOCUMENTS

| | | | | |
|---|---|---|---|---|
| 6,970,184 B2* | 11/2005 | Hirama | ...................... | B60R 1/00 348/148 |
| 8,044,776 B2* | 10/2011 | Schofield | ................ | B60C 23/00 340/425.5 |
| 8,138,899 B2 | 3/2012 | Ghneim | | |
| 8,606,467 B2 | 12/2013 | Gehin | | |
| 9,056,535 B2* | 6/2015 | Materna | .................... | B60D 1/62 |
| 9,403,413 B2* | 8/2016 | Talty | ........................ | B60D 1/36 |
| 9,694,749 B2* | 7/2017 | Lynam | .................... | B60K 35/00 |
| 9,796,228 B2* | 10/2017 | Hu | .................. | B60W 30/18036 |
| 10,155,478 B2* | 12/2018 | Hu | ............................. | B60R 1/00 |
| 10,384,609 B2* | 8/2019 | Zhang | .................... | H04N 7/183 |
| 2007/0058273 A1* | 3/2007 | Ito | ............................. | B60D 1/36 359/843 |
| 2013/0226390 A1* | 8/2013 | Luo | .......................... | B60D 1/36 701/25 |
| 2014/0188346 A1* | 7/2014 | Lavoie | .................... | B62D 13/06 701/42 |
| 2014/0218506 A1* | 8/2014 | Trombley | ............... | B60R 1/003 348/113 |

(Continued)

OTHER PUBLICATIONS

LED assembly for automotive lightning; Steward; 1998. (Year: 1998).*

(Continued)

*Primary Examiner* — Luis Perez-Fuentes
(74) *Attorney, Agent, or Firm* — Raymond Coppiellie; Price Heneveld LLP

(57) ABSTRACT

A hitch assist system is provided herein. The hitch assist system includes an imager for capturing one or more images of a hitch assembly and a trailer coupler. The imager is operably coupled with a movable panel. The hitch assembly includes a ball mount and a hitch ball. A controller is configured to generate an image that includes the hitch assembly, identify the hitch assembly within the image, estimate a ball mount length based on a predefined reference length and/or estimate a hitch ball height.

18 Claims, 11 Drawing Sheets

(56) References Cited

U.S. PATENT DOCUMENTS

| | | | |
|---|---|---|---|
| 2015/0306929 A1* | 10/2015 | McAllister | B60D 1/06 |
| | | | 177/136 |
| 2015/0321666 A1* | 11/2015 | Talty | B60D 1/62 |
| | | | 701/41 |
| 2016/0023601 A1 | 1/2016 | Windeler | |
| 2016/0052548 A1* | 2/2016 | Singh | B60D 1/36 |
| | | | 701/37 |
| 2016/0288601 A1* | 10/2016 | Gehrke | B60D 1/36 |
| 2016/0375831 A1 | 12/2016 | Wang et al. | |
| 2017/0050567 A1* | 2/2017 | Bochenek | B60R 1/003 |
| 2017/0151846 A1* | 6/2017 | Wuergler | B60D 1/36 |
| 2017/0174022 A1* | 6/2017 | Hu | G06K 9/52 |
| 2018/0312022 A1* | 11/2018 | Mattern | B62D 15/0285 |
| 2018/0361929 A1* | 12/2018 | Zhang | H04N 7/181 |
| 2019/0135059 A1* | 5/2019 | Niewiadomski | B60D 1/36 |
| 2019/0202252 A1* | 7/2019 | Mattern | B60R 1/00 |

OTHER PUBLICATIONS

LED assembly for automotive signal lightning; Steward; 1998. (Year: 1998).*
Curt Trailer Hitches & Towing Catalog; 2016. (Year: 2016).*
NPL Google Search; 2020. (Year: 2020).*

* cited by examiner

VEHICLE HITCH ASSIST SYSTEM

FIELD OF THE INVENTION

The present disclosure generally relates to autonomous and semi-autonomous vehicle systems, and more particularly, to hitch assist systems that facilitate the hitching of a vehicle to a trailer.

BACKGROUND OF THE INVENTION

The process of hitching a vehicle to a trailer can be difficult, especially to those lacking experience. Accordingly, there is a need for a system that simplifies the process by assisting a user in a simple yet intuitive manner.

SUMMARY OF THE INVENTION

According to some aspects of the present disclosure, a hitch assist system is provided herein. The hitch assist system includes an imager for capturing one or more images of a hitch assembly and a trailer coupler. The imager is operably coupled with a movable panel, wherein the hitch assembly includes a ball mount and a hitch ball. A controller is configured to generate an image that includes the hitch assembly, identify the hitch assembly within the image, and estimate a ball mount length based on a predefined reference length.

According to some aspects of the present disclosure, a method of operating a hitch assist is provided herein. The method includes rotating a tailgate operably supporting an imager from a first position to a second position. The method also includes capturing one or more images of a hitch assembly with an imager. Further, the method includes estimating a ball mount length of the hitch assembly. Additionally, the method includes rotating the tailgate from the second position to the first. Lastly, the method includes estimating a hitch ball height based on the ball mount length and projective geometry of the imager.

According to some aspects of the present disclosure, a hitch assist system is provided herein. The hitch assist system includes an imager for capturing one or more images of a hitch assembly and a trailer coupler. The hitch assist system also includes a display generating a rear contextual view based on the one or more images. The hitch assists system further includes a controller for identifying the hitch assembly, identifying a trailer coupler, displaying an overlaid line on the display that extends through the hitch assembly, and displaying a zoom window of the trailer coupler and the overlaid line.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
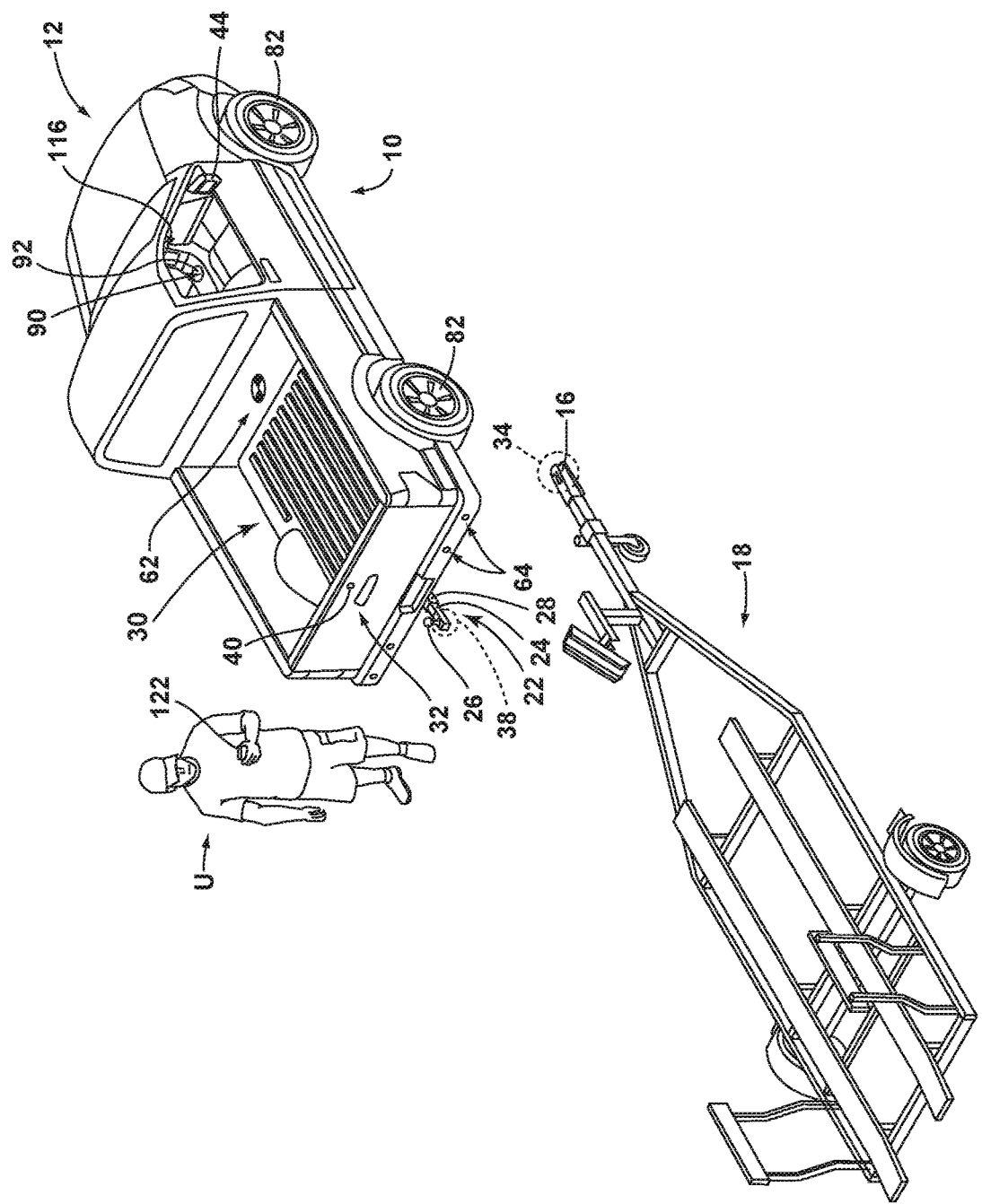
FIG. 1 is a top perspective view of a vehicle and a trailer, the vehicle being equipped with a hitch assist system, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a hitch assist system for a vehicle. The hitch assist system may include one or more imagers for capturing one or more images of a hitch assembly and/or a trailer coupler. The imager may be operably coupled with a movable panel. The hitch assembly may include a ball mount and a hitch ball. The hitch assist system further includes a controller that is configured to generate an image patch from the one or more images that includes the hitch assembly, identify the hitch assembly within the image, estimate a ball mount length based on a predefined reference length $L_{ref}$, and/or a hitch ball height. The one or more images may also be presented on a display that includes overlaid locus lines for assisting a driver in moving the vehicle towards the trailer coupler.

Figure 2:
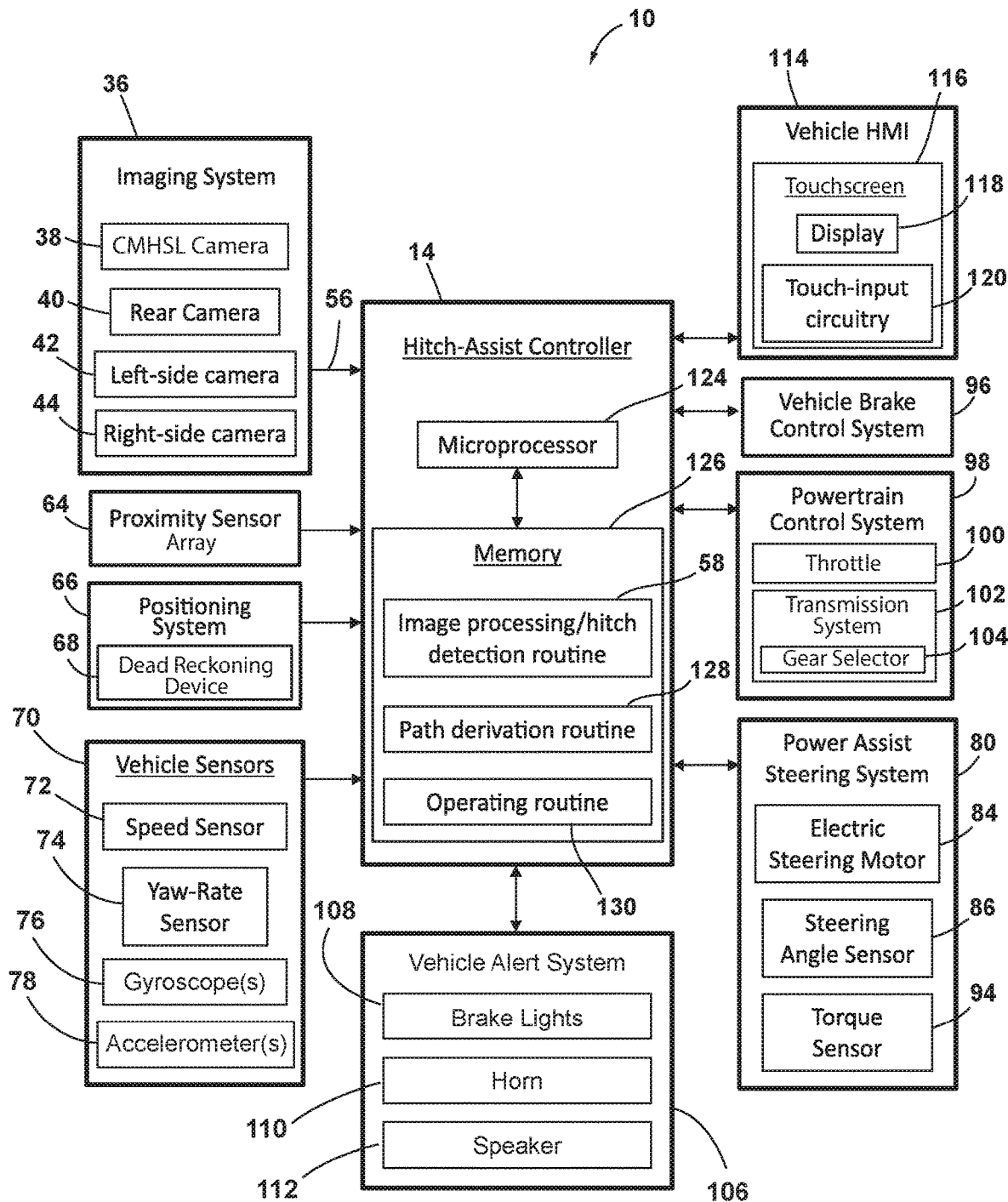
FIG. 2 is a block diagram illustrating various components of the hitch assist system, according to some examples.

Referring to FIGS. 1 and 2, reference numeral 10 designates a hitch assistance system (also referred to as a "hitch assist" system) for a vehicle 12. In particular, the hitch assist system 10 includes a controller 14 acquiring position data of a coupler 16 of a trailer 18 and deriving a vehicle path 20 (FIG. 3) to align a hitch assembly 22 of the vehicle 12 with the coupler 16. In some examples, the hitch assembly 22 may include a ball mount 24 supporting a hitch ball 26. The hitch ball 26 may be fixed on the ball mount 24 that extends from the vehicle 12 and/or the hitch ball 26 may be fixed to a portion of the vehicle 12, such as a bumper of the vehicle 12. The ball mount 24 may couple with a receiver 28 that is fixed to the vehicle 12.

As shown in FIG. 1, the vehicle 12 is exemplarily embodied as a pickup truck having a truck bed 30 that is accessible via a rotatable tailgate 32. The hitch ball 26 may be received by a hitch coupler 16 in the form of a coupler ball socket 34 that is provided at a terminal end portion of a trailer coupler 16. The trailer 18 is exemplarily embodied as a single axle trailer from which the coupler 16 extends longitudinally. It will be appreciated that additional examples of the trailer 18 may alternatively couple with the vehicle 12 to provide a pivoting connection, such as by connecting with a fifth wheel connector. It is also contemplated that additional examples of the trailer 18 may include more than one axle and may have various shapes and sizes configured for different loads and items, such as a box trailer or a flatbed trailer without departing from the teachings provided herein.

With respect to the general operation of the hitch assist system 10, as illustrated in FIG. 2, the hitch assist system 10 includes various sensors and devices that obtain or otherwise provide vehicle status-related information. For example, in some instances, the hitch assist system 10 incorporates an imaging system 36 that includes one or more exterior imagers 38, 40, 42, 44, or any other vision-based device. The one or more imagers 38, 40, 42, 44 each include an area-type image sensor, such as a CCD or a CMOS image sensor, and image-capturing optics that captures an image of an imaging field of view (e.g., field of views 46, 48, 50, 52, FIG. 5) defined by the image-capturing optics. In some instances, the one or more imagers 38, 40, 42, 44 may derive an image patch 54 (FIG. 8) from multiple image frames that may be shown on the display 118. In various examples, the hitch assist system 10 may include any one or more of a center high-mount stop light (CMHSL) imager 38, a rear imager 40, a left-side side-view imager 42, and/or a right-side side-view imager 44, although other arrangements including additional or alternative imagers are possible without departing from the scope of the present disclosure.

In some examples, the imaging system 36 can include the rear imager 40 alone or can be configured such that the hitch assist system 10 utilizes only the rear imager 40 in a vehicle 12 with the multiple exterior imagers 38, 40, 42, 44. In some instances, the various imagers 38, 40, 42, 44 included in the imaging system 36 can be positioned to generally overlap in their respective fields of view, which in the depicted arrangement of FIG. 5 includes fields of view 46, 48, 50, 52 to correspond with the CMHSL imager 38, the rear imager 40, and the side-view imagers 42 and 44, respectively. In this manner, image data 56 from two or more of the imagers 38, 40, 42, 44 can be combined in an image processing routine 58, or in another dedicated image processor within the imaging system 36, into a single image or image patch 54. In an extension of such examples, the image data 56 can be used to derive stereoscopic image data 56 that can be used to reconstruct a three-dimensional scene of the area or areas within overlapped areas of the various fields of view 46, 48, 50, 52, including any objects (e.g., obstacles or the coupler 16) therein.

In some examples, the use of two images including the same object can be used to determine a location of the object relative to the two imagers 38, 40, 42, 44, given a known spatial relationship between the imagers 38, 40, 42, 44. In this respect, the image processing routine 58 can use known programming and/or functionality to identify an object within the image data 56 from the various imagers 38, 40, 42, 44 within the imaging system 36. The image processing routine 58 can include information related to the positioning of any of the imagers 38, 40, 42, 44 present on the vehicle 12 or utilized by the hitch assist system 10, including relative to a center 62 (FIG. 1) of the vehicle 12. For example, the positions of the imagers 38, 40, 42, 44 relative to the center 62 of the vehicle 12 and/or to each other can be used for object positioning calculations and to result in object position data relative to the center 62 of the vehicle 12, for example, or other features of the vehicle 12, such as the hitch ball 26 (FIG. 1), with known positions relative to the center 62 of the vehicle 12.

With further reference to FIGS. 1 and 2, a proximity sensor 64 or an array thereof, and/or other vehicle sensors, may provide sensor signals that the controller 14 of the hitch assist system 10 may process with various routines to determine various objects proximate the vehicle 12, the trailer 18, and/or the coupler 16 of the trailer 18. The proximity sensor 64 may also be utilized to determine a height and position 134 (FIG. 3) (e.g., based on the distance $D_h$ and angle $\alpha_h$) of the coupler 16. The proximity sensor 64 may be configured as any type of sensor, such as an ultrasonic sensor, a radio detection and ranging (RADAR) sensor, a sound navigation and ranging (SONAR) sensor, a light detection and ranging (LIDAR) sensor, a vision-based sensor, and/or any other type of sensor known in the art.

Figure 3:
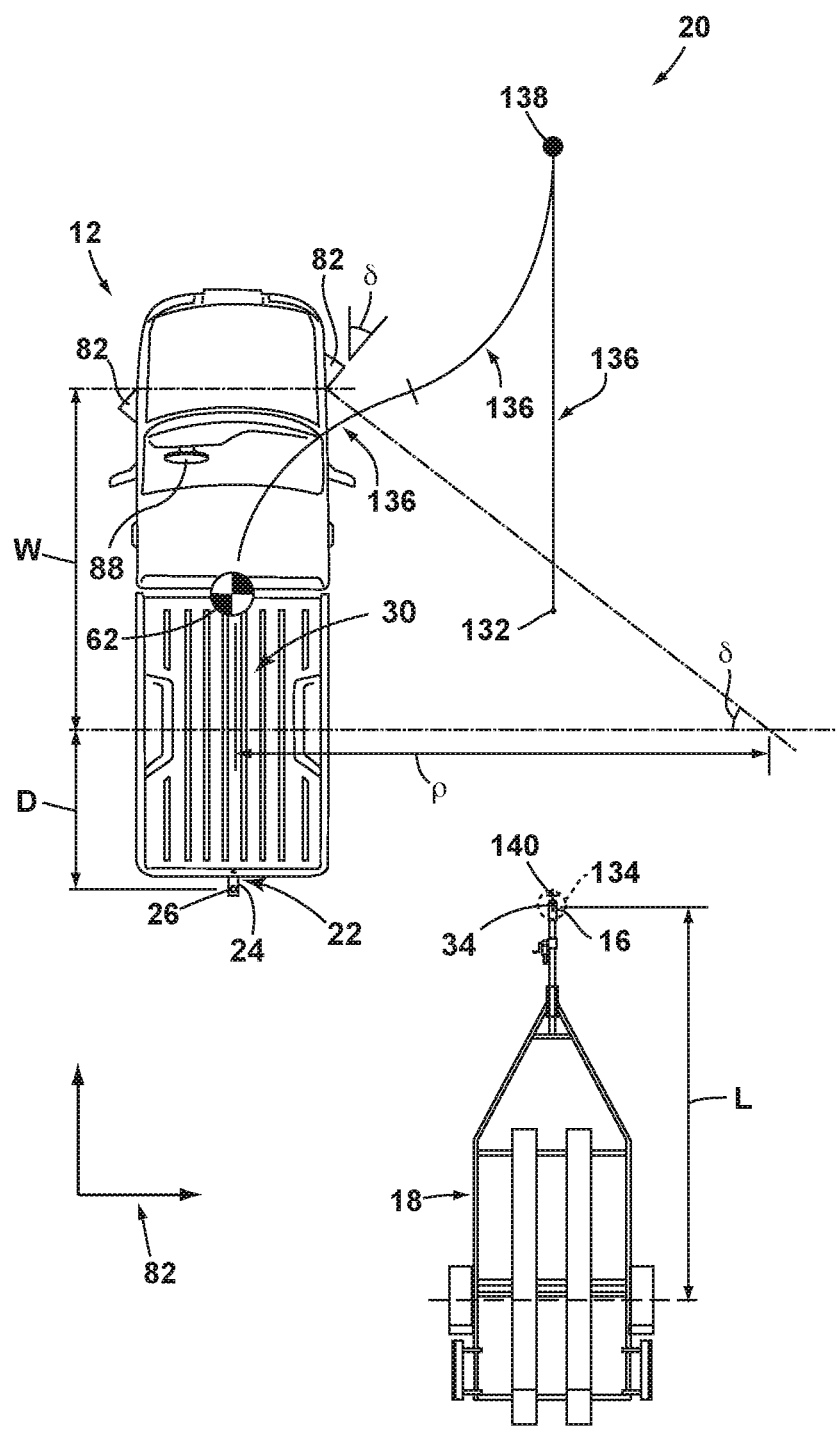
FIG. 3 is an overhead schematic view of the vehicle during a step of the alignment sequence with the trailer, according to some examples.
Figure 4:
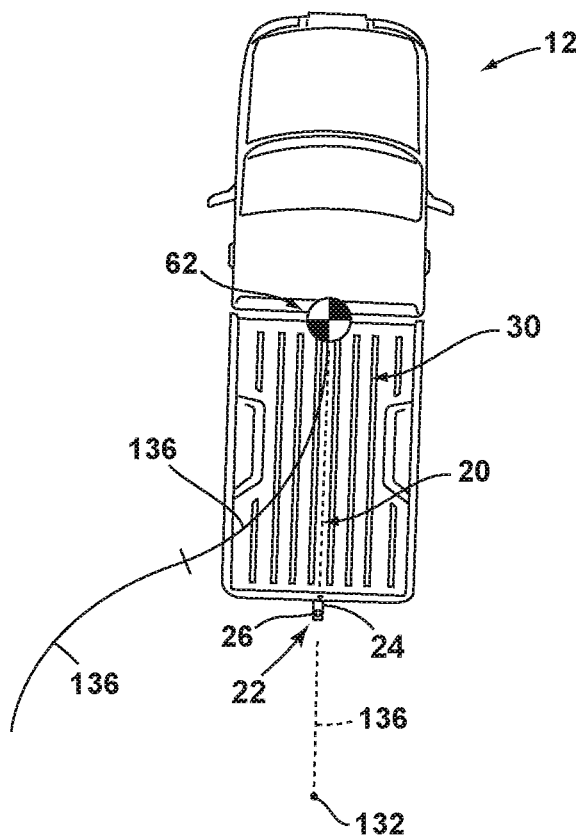
FIG. 4 is an overhead schematic view of the vehicle during a subsequent step of the alignment sequence with the trailer, according to some examples.
Figure 4:
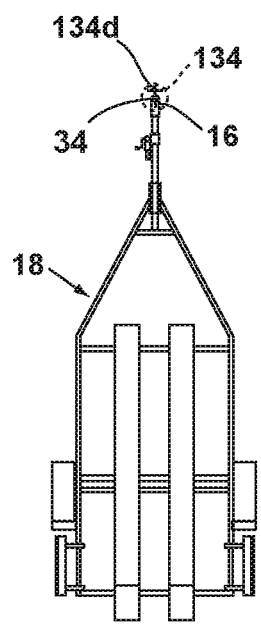

Referring still to FIGS. 1 and 2, a positioning system 66, which may include a dead reckoning device 68 or, in addition, or as an alternative, a global positioning system (GPS), may determine a coordinate location of the vehicle 12. For example, the dead reckoning device 68 can establish and track the coordinate location of the vehicle 12 within a localized coordinate system based at least on vehicle speed and/or steering angle δ (FIG. 3). The controller 14 may also be operably coupled with various vehicle sensors 70, such as a speed sensor 72 and a yaw rate sensor 74. Additionally, the controller 14 may communicate with one or more gyroscopes 76 and accelerometers 78 to measure the position, orientation, direction, and/or speed of the vehicle 12.

To enable autonomous or semi-autonomous control of the vehicle 12, the controller 14 of the hitch assist system 10 may be further configured to communicate with a variety of vehicle systems. According to some examples, the controller 14 of the hitch assist system 10 may control a power assist steering system 80 of the vehicle 12 to operate the steered road wheels 82 of the vehicle 12 while the vehicle 12 moves toward the trailer 18 along a vehicle backup path 20. The power assist steering system 80 may be an electric power-assisted steering (EPAS) system that includes an electric steering motor 84 for turning the steered road wheels 82 to a steering angle δ based on a steering command generated by the controller 14, whereby the steering angle δ may be sensed by a steering angle sensor 86 of the power assist steering system 80 and provided to the controller 14. As described herein, the steering command may be provided for autonomously steering the vehicle 12 during a backup maneuver and may alternatively be provided manually via a rotational position (e.g., a steering wheel angle) of a steering wheel 88 (FIG. 3) or a steering input device 90, which may be provided to enable a driver to control or otherwise modify the desired curvature of the backing path 20 of vehicle 12. The steering input device 90 may be communicatively coupled to the controller 14 in a wired or wireless manner and provides the controller 14 with information defining the desired curvature of the backing path 20 of the vehicle 12. In response, the controller 14 processes the information and generates corresponding steering commands that are supplied to the power assist steering system 80 of the vehicle 12. In some examples, the steering input device 90 includes a rotatable knob 92 operable between a number of rotated positions that each provides an incremental change to the desired curvature of the backing path 20 of the vehicle 12.

In some examples, the steering wheel 88 of the vehicle 12 may be mechanically coupled with the steered road wheels 82 of the vehicle 12, such that the steering wheel 88 moves in concert with steered road wheels 82 via an internal torque, thereby preventing manual intervention with the steering wheel 88 during autonomous steering of the vehicle 12. In such instances, the power assist steering system 80 may include a torque sensor 94 that senses torque (e.g., gripping and/or turning) on the steering wheel 88 that is not expected from the autonomous control of the steering wheel 88 and therefore is indicative of manual intervention by the driver. In some examples, the external torque applied to the steering wheel 88 may serve as a signal to the controller 14 that the driver has taken manual control and for the hitch assist system 10 to discontinue autonomous steering functionality.

The controller 14 of the hitch assist system 10 may also communicate with a vehicle brake control system 96 of the vehicle 12 to receive vehicle speed information such as individual wheel speeds of the vehicle 12. Additionally or alternatively, vehicle speed information may be provided to the controller 14 by a powertrain control system 98 and/or the vehicle speed sensor 72, among other conceivable means. The powertrain control system 98 may include a throttle 100 and a transmission system 102. A gear selector 104 may be disposed within the transmission system 102 that controls the mode of operation of a vehicle transmission. In some examples, the controller 14 may provide braking commands to the vehicle brake control system 96, thereby allowing the hitch assist system 10 to regulate the speed of the vehicle 12 during a backup maneuver of the vehicle 12. It will be appreciated that the controller 14 may additionally or alternatively regulate the speed of the vehicle 12 via interaction with the powertrain control system 98.

Through interaction with the power assist steering system 80, the vehicle brake control system 96, and/or the powertrain control system 98 of the vehicle 12, the potential for unacceptable backup conditions can be reduced when the vehicle 12 is backing toward the trailer 18. Examples of unacceptable backup conditions include, but are not limited to, a vehicle over-speed condition, sensor failure, and the like. In such circumstances, the driver may be unaware of the failure until the unacceptable backup condition is imminent or already happening. Therefore, it is disclosed herein that the controller 14 of the hitch assist system 10 can generate an alert signal corresponding to a notification of an actual, impending, and/or anticipated unacceptable backup condition, and prior to driver intervention, generate a countermeasure to prevent such an unacceptable backup condition.

According to some examples, the controller 14 may communicate with one or more devices, including a vehicle alert system 106, which may prompt visual, auditory, and tactile notifications and/or warnings. For instance, vehicle brake lights 108 and/or vehicle emergency flashers may provide a visual alert. A vehicle horn 110 and/or speaker 112 may provide an audible alert. Additionally, the controller 14 and/or vehicle alert system 106 may communicate with a human-machine interface (HMI) 114 of the vehicle 12. The HMI 114 may include a touchscreen 116 such as a navigation and/or entertainment display 118 mounted within a cockpit module and/or an instrument cluster, which may be capable of displaying images, indicating the alert.

In some instances, the HMI 114 further includes an input device, which can be implemented by configuring the display 118 as a portion of the touchscreen 116 with circuitry 120 to receive an input corresponding with a location over the display 118. Other forms of input, including one or more joysticks, digital input pads, or the like can be used in place or in addition to touchscreen 116.

Further, the hitch assist system 10 may communicate via wired and/or wireless communication with some instances of the HMI 114 and/or with one or more handheld or portable devices 122 (FIG. 1). The network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The portable device 122 may also include the display 118 for displaying one or more images and other information to a user U. For instance, the portable device 122 may display one or more images of the trailer 18 on the display 118 and may be further able to receive remote user inputs via touchscreen circuitry 120. In addition, the portable device 122 may provide feedback information, such as visual, audible, and tactile alerts. It will be appreciated that the portable device 122 may be any one of a variety of computing devices and may include a processor and memory. For example, the portable device 122 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

The controller 14 is configured with a microprocessor 124 and/or other analog and/or digital circuitry for processing one or more logic routines stored in a memory 126. The logic routines may include one or more routines including an image processing routine 58 and/or hitch detection routine, a path derivation routine 128, and an operating routine 130. Information from the imager 40 or other components of the hitch assist system 10 can be supplied to the controller 14 via a communication network of the vehicle 12, which can include a controller area network (CAN), a local interconnect network (LIN), or other protocols used in the automotive industry. It will be appreciated that the controller 14 may be a stand-alone dedicated controller or may be a shared controller integrated with the imager 40 or other component of the hitch assist system 10 in addition to any other conceivable onboard or off-board vehicle control systems.

The controller 14 may include any combination of software and/or processing circuitry suitable for controlling the various components of the hitch assist system 10 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. All such computing devices and environments are intended to fall within the meaning of the term "controller" or "processor" as used herein unless a different meaning is explicitly provided or otherwise clear from the context.

With further reference to FIGS. 2-6, the controller 14 may generate vehicle steering information and commands as a function of all or a portion of the information received. Thereafter, the vehicle steering information and commands may be provided to the power assist steering system 80 for effecting the steering of the vehicle 12 to achieve a commanded path 20 of travel for alignment with the coupler 16 of the trailer 18. It will further be appreciated that the image processing routine 58 may be carried out by a dedicated processor, for example, within a stand-alone imaging system 36 for vehicle 12 that can output the results of its image processing to other components and systems of vehicle 12, including the microprocessor 124. Further, any system, computer, processor, or the like that completes image processing functionality, such as that described herein, may be referred to herein as an "image processor" regardless of other functionality it may also implement (including simultaneously with executing the image processing routine 58).

As discussed further, below, the height $H_{hb}$ (FIG. 9) (or a vertical component of the data including the location) of the hitch ball 26 can be used in connection with a determined height $H_c$ (FIG. 12) of the coupler 16 to determine a desired endpoint 132 of the vehicle path 20 for alignment between the hitch ball 26 and the coupler 16 when the coupler 16 is lowered into a position over (and, accordingly, engaged with) the hitch ball 26.

In some examples, the image processing routine 58 can be specifically programmed or otherwise configured to locate the coupler 16 within the image data 56. In some instances, the image processing routine 58 can identify the coupler 16 within the image data 56 based on stored or otherwise known visual characteristics of the coupler 16 or hitches in general. In some instances, a marker in the form of a sticker or the like may be affixed with trailer 18 in a specified position relative to coupler 16 in a manner similar to that which is described in commonly-assigned U.S. Pat. No. 9,102,271, entitled "TRAILER MONITORING SYSTEM AND METHOD," the entire disclosure of which is incorporated by reference herein. In such examples, the image processing routine 58 may be programmed with identifying characteristics of the marker for location in the image data 56, as well as the positioning of the coupler 16 relative to such a marker so that a location of the coupler 16 can be determined based on the marker location. Additionally or alternatively, the controller 14 may seek confirmation of the determined coupler 16, via a prompt on the touchscreen 116 and/or the portable device 122. If the coupler 16 determination is not confirmed, further image processing may be provided, or user-adjustment of the position 134 of the coupler 16 may be facilitated, either using the touchscreen 116 or another input to allow the user to move the depicted position 134 of the coupler 16 on the touchscreen 116, which the controller 14 uses to adjust the determination of the position 134 of the coupler 16 with respect to the vehicle 12 based on the above-described use of the image data 56. Alternatively, the user can visually determine the position 134 of the coupler 16 within an image presented on HMI 114 and can provide a touch input in a manner similar to that, which is described in co-pending, commonly-assigned U.S. patent application Ser. No. 15/583,014, filed May 1, 2017, and entitled "SYSTEM TO AUTOMATE HITCHING A TRAILER," now U.S. Pat. No. 10,266,023 the entire disclosure of which is incorporated by reference herein. The image processing routine 58 can then correlate the location of the touch input with the coordinate system applied to the image.

As shown in FIGS. 3-6, in some exemplary instances of the hitch assist system 10, the image processing routine 58 and operating routine 130 may be used in conjunction with each other to determine the path 20 along which the hitch assist system 10 can guide the vehicle 12 to align the hitch ball 26 and the coupler 16 of the trailer 18. In the example shown, an initial position of the vehicle 12 relative to the trailer 18 may be such that the coupler 16 is in the field of view 50 of the side imager 42, with the vehicle 12 being positioned laterally from the trailer 18 but with the coupler 16 being almost longitudinally aligned with the hitch ball 26. In this manner, upon initiation of the hitch assist system 10, such as by user input on the touchscreen 116, for example, the image processing routine 58 can identify the coupler 16 within the image data 56 of the imager 42 and estimate the position 134 of the coupler 16 relative to the hitch ball 26 using the image data 56 in accordance with the examples discussed above or by other known means, including by receiving focal length information within image data 56 to determine a distance $D_c$ to the coupler 16 and an angle $\alpha_c$ of offset between the coupler 16 and the longitudinal axis of vehicle 12. This information can then be used in light of the position 134 of the coupler 16 within the fields of view 46, 48, 50, 52 of the image data 56 to determine or estimate the height $H_c$ of coupler 16. Once the positioning $D_c$, $\alpha_c$ of the coupler 16 has been determined and, optionally, confirmed by the user, the controller 14 can take control of at least the vehicle steering system 80 to control the movement of the vehicle 12 along the desired path 20 to align the vehicle hitch ball 26 with the coupler 16.

Continuing with reference to FIG. 3, the controller 14 (FIG. 2), having estimated the positioning $D_c$, $\alpha_c$ of the coupler 16, as discussed above, can, in some examples, execute the path derivation routine 128 to determine the vehicle path 20 to align the vehicle hitch ball 26 with the coupler 16. The controller 14 can store various characteristics of vehicle 12, including a wheelbase W, a distance D from the rear axle to the hitch ball 26, which is referred to herein as the drawbar length, as well as a maximum angle to which the steered wheels 82 can be turned $\delta_{max}$. As shown, the wheelbase W and the current steering angle $\delta$ can be used to determine a corresponding turning radius $\rho$ for the vehicle 12 according to the equation:

$$\rho = \frac{1}{W\tan\delta}, \qquad (1)$$

in which the wheelbase W is fixed and the steering angle $\delta$ can be controlled by the controller 14 by communication with the steering system 80, as discussed above. In this manner, when the maximum steering angle $\delta_{max}$ is known, the smallest possible value for the turning radius $\rho_{min}$ is determined as:

$$\rho_{min} = \frac{1}{W\tan\delta_{max}}. \qquad (2)$$

The path derivation routine 128 can be programmed to derive the vehicle path 20 to align a known location of the vehicle hitch ball 26 with the estimated position 134 of the coupler 16 that takes into account the determined minimum turning radius $\rho_{min}$, which may allow the path 20 to use the minimum amount of space and maneuvers. In this manner, the path derivation routine 128 can use the position of the vehicle 12, which can be based on the center 62 of the vehicle 12, a location along the rear axle, the location of the dead reckoning device 68, or another known location on the coordinate system, to determine both a lateral distance to the coupler 16 and a forward or rearward distance to coupler 16 and derive the path 20 that achieves lateral and/or forward-backward movement of the vehicle 12 within the limitations of the steering system 80. The derivation of the path 20 further takes into account the positioning of the hitch ball 26, based on a length $L_{bm}$ of the ball mount 24, relative to the tracked location of vehicle 12 (which may correspond with the center 62 of mass of the vehicle 12, the location of a GPS receiver, or another specified, known area) to determine the needed positioning of the vehicle 12 to align the hitch ball 26 with the coupler 16.

Once the desired path 20, including the endpoint 132, has been determined, the controller 14 may at least control the steering system 80 of the vehicle 12 with the powertrain control system 98 and the brake control system 96 (whether controlled by the driver or by the controller 14) controlling the velocity (forward or rearward) of the vehicle 12. In this manner, the controller 14 can receive data regarding the position of the vehicle 12 during movement thereof from the positioning system 66 while controlling the steering system 80 to maintain the vehicle 12 along the path 20. The path 20, having been determined based on the vehicle 12 and the geometry of steering system 80, can adjust the steering angle $\delta$, as dictated by the path 20, depending on the position of the vehicle 12 therealong. It is additionally noted that in some examples, the path 20 may comprise a progression of steering angle $\delta$ adjustments that are dependent on the tracked vehicle position.

As illustrated in FIG. 3, the initial positioning of the trailer 18 relative to the vehicle 12 may be such that forward movement of vehicle 12 is needed for the desired vehicle path 20, such as when the trailer 18 is laterally offset to the side of vehicle 12. In this manner, the path 20 may include various segments 136 of forward driving and/or rearward driving of the vehicle 12 separated by inflection points 138 at which the vehicle 12 transitions between forward and rearward movement. In some examples, the path derivation routine 128 can be configured to include a straight backing segment 136 for a defined distance before reaching the point at which the hitch ball 26 is aligned with the position 134 of the coupler 16. The remaining segments 136 can be determined to achieve the lateral and forward/backward movement within the smallest area possible and/or with the lowest number of overall segments 136 or inflection points 138. In the illustrated example of FIG. 3, the path 20 can include two segments 136 that collectively traverse the lateral movement of the vehicle 12, while providing a segment 136 of straight, rearward backing to bring the hitch ball 26 into alignment with the coupler 16, one of which includes forward driving with a maximum steering angle $\delta_{max}$ in the rightward-turning direction and the other including forward driving with a maximum steering angle $\delta_{max}$ in the leftward-turning direction. Subsequently, a single inflection point 138 is included in which the vehicle 12 transitions from forward driving to rearward driving followed by the previously-mentioned straight rearward backing segment 136. It is noted that variations in the depicted path 20 may be used, including a variation with a single forward-driving segment 136 at a rightward steering angle $\delta$ less than the maximum steering angle $\delta_{max}$, followed by an inflection point 138 and a rearward driving segment 136 at a maximum leftward steering angle $\delta_{max}$ with a shorter straight backing segment 136, with still further paths 20 being possible.

In some instances, the hitch assist system 10 may be configured to operate with the vehicle 12 in reverse only, in which case, the hitch assist system 10 can prompt the driver to drive vehicle 12, as needed, to position the trailer 18 in a designated area relative to the vehicle 12, including to the rear thereof so that path derivation routine 128 can determine a vehicle path 20 that includes rearward driving. Such instructions can further prompt the driver to position the vehicle 12 relative to the trailer 18 to compensate for other limitations of the hitch assist system 10, including a particular distance for identification of the coupler 16, a minimum offset angle $\alpha_c$, or the like. It is further noted that the estimates for the positioning $D_c$, $\alpha_c$ of the coupler 16 may become more accurate as the vehicle 12 traverses the path 20, including to position the vehicle 12 in front of the trailer 18 and as the vehicle 12 approaches the coupler 16. Accordingly, such estimates can be derived and used to update the path derivation routine 128, if desired, in the determination of the adjusted endpoint 132 for the path 20, as discussed above.

Figure 6:
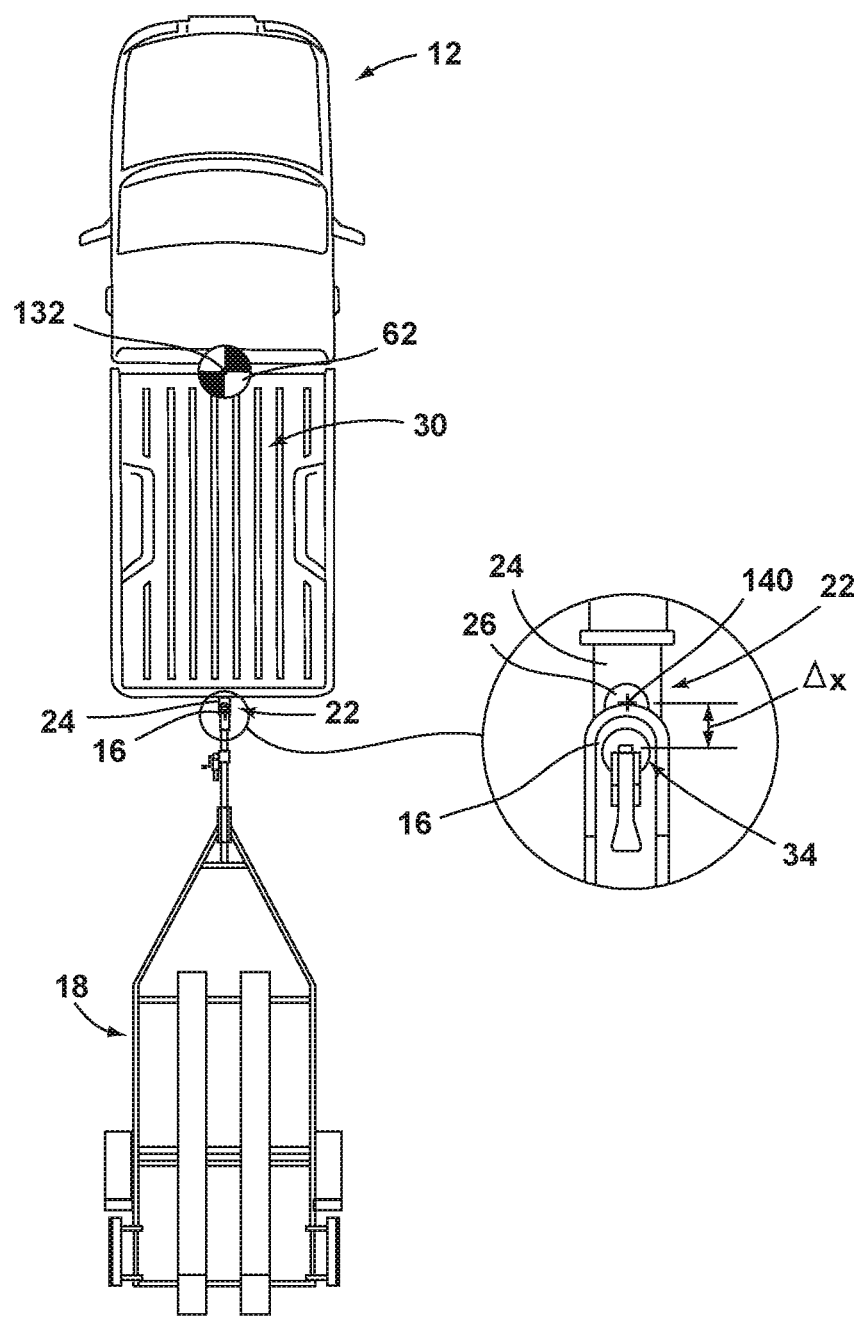
FIG. 6 is an overhead schematic view of the vehicle during a subsequent step of the alignment sequence with the trailer and showing the position of a hitch ball of the vehicle at an end of a derived alignment path, according to some examples.

As shown in FIG. 6, a strategy for determining an endpoint 132 for the vehicle path 20 that places hitch ball 26 in a desired position for alignment with the coupler 16 given the vertical component of the position 134 of the coupler 16 involves calculating the actual or an approximate trajectory for movement of the coupler 16 while lowering the coupler 16 on to the hitch ball 26. The endpoint 132 is then derived, as discussed above or otherwise, to place hitch ball 26 at the desired location 140 on that trajectory. In effect, such a scheme is implemented by determining the difference between the height $H_c$ of the coupler 16 and the height $H_{hb}$ of the hitch ball 26, which represents the vertical distance by which coupler 16 will be lowered to engage with hitch ball 26. The determined trajectory is then used to relate the vertical distance with a corresponding horizontal distance Δx of coupler 16 movement in the driving direction that results from the vertical distance. This horizontal distance Δx can be input into the path derivation routine 128 as the desired endpoint 132 thereof or can be applied as an offset to the endpoint 132 derived from the initially determined position 134 of the coupler 16 when the path 20 ends with the straight-backing segment 136, as illustrated in FIG. 3.

Figure 5:
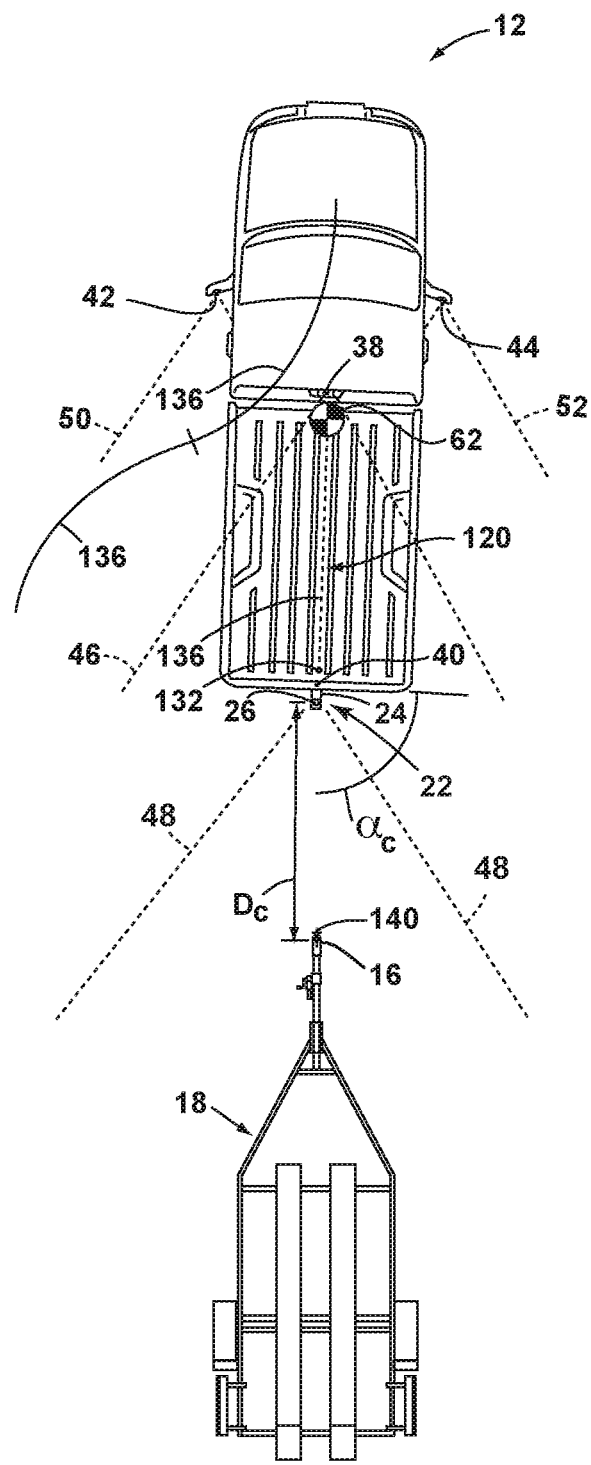
FIG. 5 is an overhead schematic view of the vehicle during a subsequent step of the alignment sequence with the trailer, according to some examples.

Referring to FIGS. 5 and 6, the operating routine 130 may continue to guide the vehicle 12 until the hitch ball 26 is in the desired position 140 relative to the coupler 16 for the coupler 16 to engage with the hitch ball 26 when the coupler 16 is lowered into alignment and/or engagement therewith. In the examples discussed above, the image processing routine 58 continuously monitors the positioning $D_c$, $\alpha_c$ of the coupler 16 during execution of the operating routine 130, including as the coupler 16 comes into clearer view of the rear imager 40 with continued movement of the vehicle 12 along the path 20. As discussed above, the position of the vehicle 12 can also be monitored by the dead reckoning device 68 with the position 134 of the coupler 16 being updated and fed into the path derivation routine 128 in case the path 20 and or the endpoint 132 can be refined or should be updated (due to, for example, improved height $H_c$, distance $D_c$, or offset angle $\alpha_c$ information due to closer resolution or additional image data 56), including as the vehicle 12 moves closer to the trailer 18. In some instances, the coupler 16 can be assumed to be static such that the position of the vehicle 12 can be tracked by continuing to track the coupler 16 to remove the need for use of the dead reckoning device 68. In a similar manner, a modified variation of the operating routine 130 can progress through a predetermined sequence of maneuvers involving steering of the vehicle 12 at or below a maximum steering angle $\delta_{max}$, while tracking the position $D_c$, $\alpha_c$ of the coupler 16 to converge the known relative position of the hitch ball 26 to the desired position 140 thereof relative to the tracked position 134 of the coupler 16.

Figure 7:
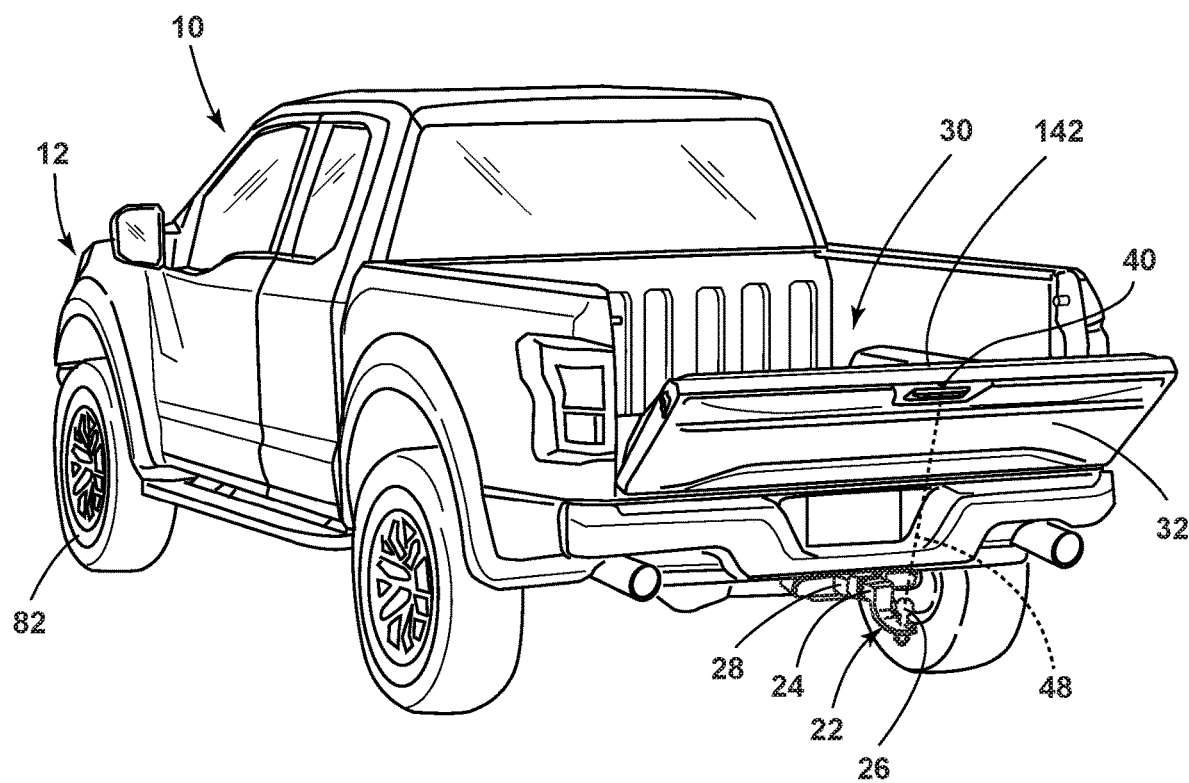
FIG. 7 is a rear perspective view of the vehicle with a tailgate rotated from a first position to a second position, according to some examples.
Figure 8:
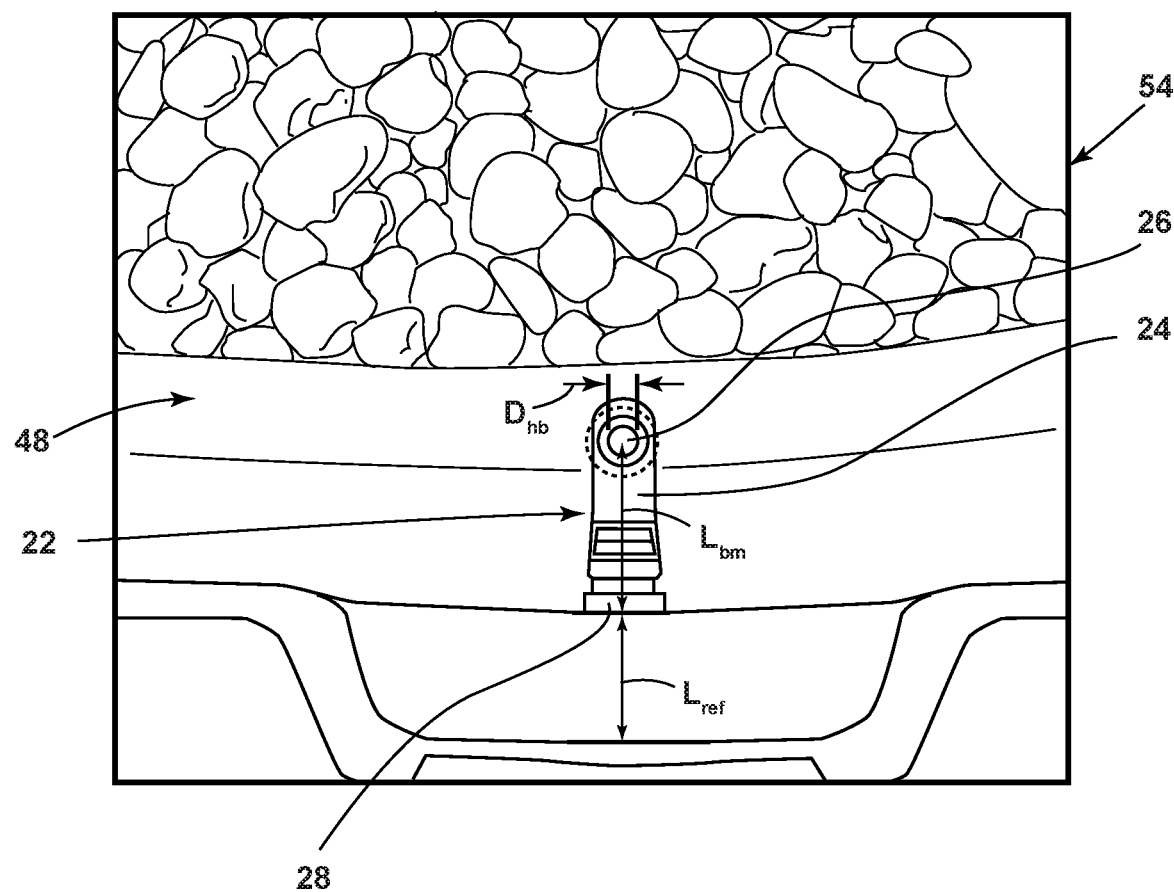
FIG. 8 is a representative image patch generated by a rear imager disposed within the tailgate, according to some examples.

Referring to FIGS. 7 and 8, in some examples, the tailgate 32 of the vehicle 12 may be rotated between first and second positions. In the first position, as illustrated in FIG. 1, the tailgate 32 may be oriented in an upward direction and latched to a stationary portion of the vehicle 12, such as a bed frame 142. In the second position, as illustrated in FIG. 7, the tailgate 32 may be unlatched and rotated from the first position. The tailgate 32 may be manually and/or electrically rotated between the first position and second position. In manual examples, a stop, a support, and/or any other feature may be utilized for maintaining the tailgate 32 in the second position. Additionally and/or alternatively, in electrically rotated examples, a gear system, an actuator, and/or any other practical system may be utilized for rotating and maintaining the tailgate 32 in the second position. Further, it will be appreciated that the tailgate 32 of the vehicle 12 may be rotated in any direction without departing from the scope of the present disclosure. For example, the tailgate 32 may rotate downward, as illustrated in FIG. 7, upward, and/or laterally outward without departing from the teachings provided herein.

The rear imager 40 may be disposed within the tailgate 32 and configured to provide image data 56 rearwardly of the vehicle 12. As the tailgate 32 is rotated from the first position to the second position, the rear imager 40 is moved rearwardly and oriented more downward of its location relative to instances when the tailgate 32 is disposed in the first position. Accordingly, when the tailgate 32 is moved to the second position, the imager 40 may be capable of imaging a top view, or a bird's eye view, of the hitch ball 26 and can provide the image data 56 to the controller 14 for use by the image processing routine 58 (by the process described above or by other available processes) to determine the height $H_b$ of hitch ball 26. Once a height of the hitch ball 26 is determined, the hitch assist system 10 can store the height $H_b$ of that distinct hitch ball 26 for future use, possibly without having to measure various characteristics of the ball mount 24 and hitch ball 26 during subsequent hitch assist operations.

Due to the wide variety of ball mounts 24 and hitch balls 26, or connectors, that may be utilized, the hitch assist system 10 may utilize the one or more imagers 38, 40, 42, 44 to determine various characteristics of the hitch assembly 22, including the ball mount length $L_{bm}$ and/or the hitch ball height $H_{hb}$. The various characteristics may be stored in the memory 126 of the hitch assist system 10 once determined. In some examples, during an initial setup routine for the hitch assist system 10, the user U can be prompted to install the hitch assembly 22 to the vehicle 12 by way of assembling a ball mount 24 including the hitch ball 26 within the receiver 28 positioned on the rear of vehicle 12. If no hitch assemblies are stored within the memory 126 or the hitch assembly 22 attached to the vehicle 12 is unrecognized when compared to any previously attached and recognized hitch assemblies, the user can then be asked to rotate the tailgate 32 from the first position to the second position, if the tailgate 32 is not already disposed in the second position. Alternatively, the tailgate 32 may move to the second position without assistance from the user once the setup routine is initiated.

Figure 9:
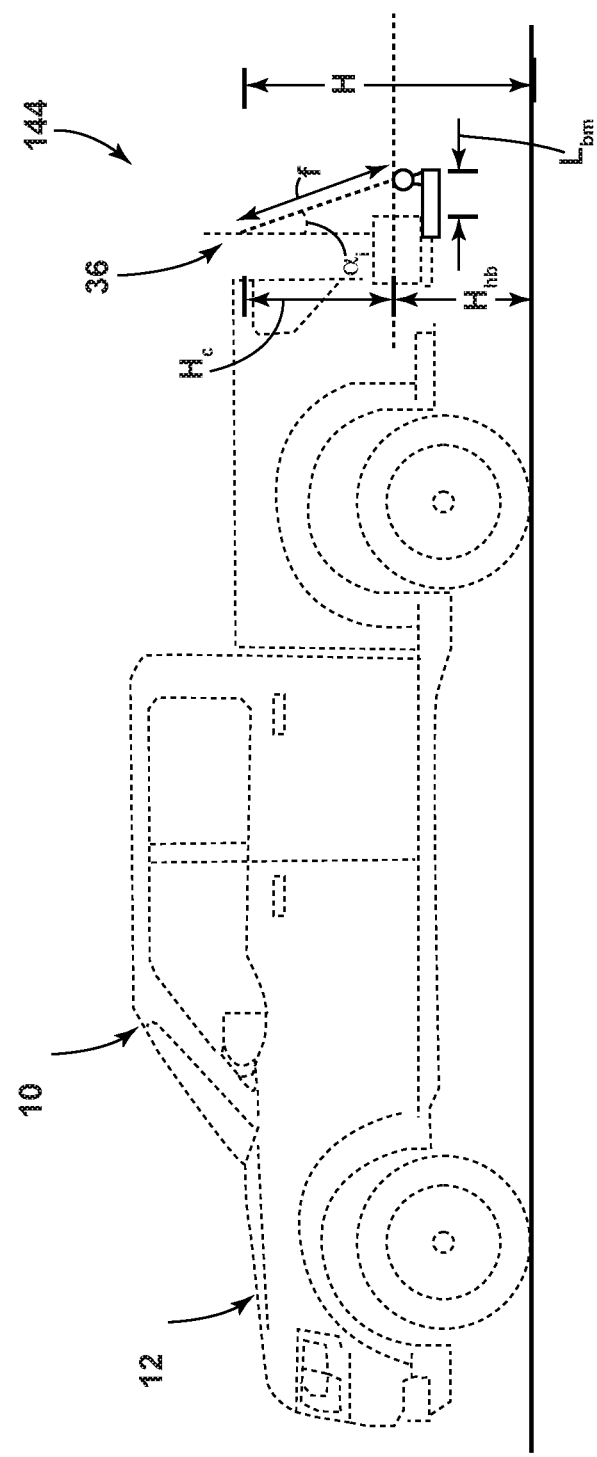
FIG. 9 is a rear side view of a vehicle having a hitch assembly operably coupled thereto, according to some examples.

Referring to FIGS. 8 and 9, when the tailgate 32 is in the second position, the bumper and the hitch assembly 22 may be within the field of view 48 of the rear imager 40, as shown in FIG. 8, such that image data 56 can be collected and processed to determine the ball mount length $L_{bm}$. However, it will be appreciated that any other component of the vehicle 12 may be within the field of view 48 of the rear imager 40. In some instances, a portion of the bumper proximate to the hitch assembly 22, or another vehicle component, may define a reference length $L_{ref}$ that is stored within the memory 126. The length of the ball mount $L_{bm}$ is compared to the reference length $L_{ref}$ to the ball mount length $L_{bm}$ to determine the length $L_{bm}$ of the ball mount 24. A diameter $D_{hb}$ of the hitch ball 26 may also be determined by comparing the reference length $L_{ref}$ to a diameter $D_{hb}$ of the hitch ball 26. The controller 14 may utilize any image processing techniques to determine the length $L_{bm}$ of the ball mount 24. It will be appreciated, however, that the length $L_{bm}$ of the ball mount 24 may also be calculated by other sensors or modules in the vehicle 12 using any distance measuring technique.

Referring to FIG. 9, a pinhole imager model 144 is shown generally representing the rear imager 40 in relation to the hitch assembly 22 in which projective geometry of the imager 40 may be used to determine a height $H_{hb}$ of the hitch ball 26. As depicted, $\alpha_i$ denotes the pitch of the rear imager 40, f denotes the focal length of the rear imager 40, $H_i$ denotes the height of the rear imager 40 relative to the ground, $H_{hb}$ denotes a height of the hitch ball 26 relative to the ground, $H_c$ denotes a height of the rear imager 40 relative to the hitch ball 26, and $L_{bm}$ is the distance between the hitch ball 26 and the vehicle 12.

From the imager model 144, a length of the ball mount 24 and the focal length f of the rear imager 40 is provided by the following equation:

$$\frac{f}{\sin(90)} = \frac{L_{bm}}{\alpha_i} \quad (3)$$

In equation 3, $L_{bm}$, is known from the image processing described above and $\alpha_i$ corresponds to the pitch of the rear imager 40, which is known. Once the focal length f is determined, the height $H_c$ between the hitch ball 26 and the rear imager 40 may be determined by the following equation:

$$H_c = \sqrt{f^2 - L_{bm}^2} \quad (4)$$

In equation 4, f and $L_{bm}$ are assumed known. Since the height H of the rear imager 40 in relation to the ground is known, the height $H_{hb}$ of the hitch ball 26 can be obtained by subtracting the height $H_c$ between the hitch ball 26 and the rear imager 40 from the height H of the rear imager 40 relative a ground surface. In some instances, additional payload may be disposed within the vehicle 12 causing a change in the height H of the rear imager 40 relative to the ground. This can be accounted for through any practicable method including calculating the new height H of the rear imager 40 relative the ground through various image-processing techniques and/or through any other sensor that may be disposed on any portion of the vehicle 12.

Figure 10:
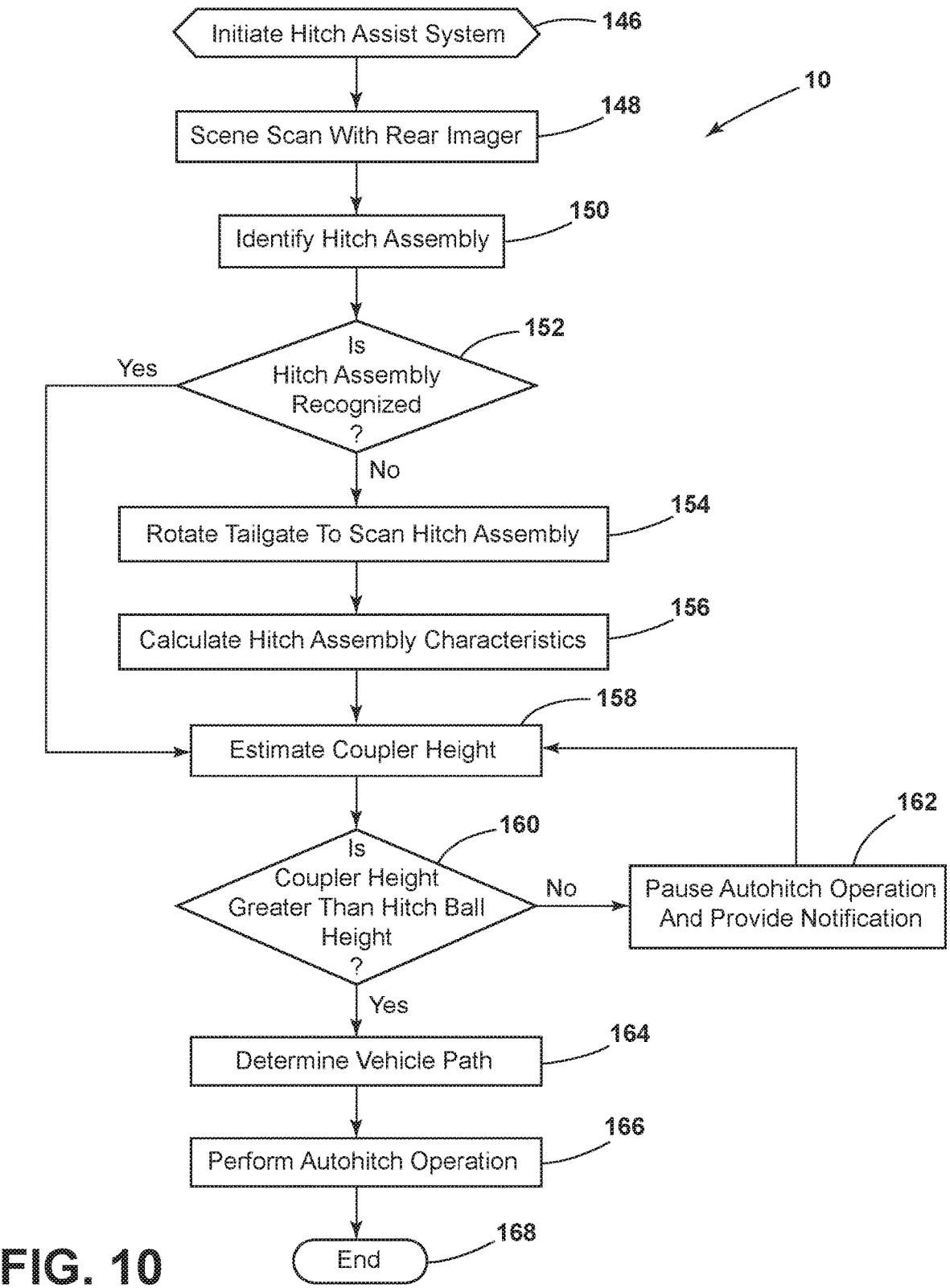
FIG. 10 is a flowchart illustrating the steps in the alignment sequence, according to some examples.

Turning now to FIG. 10, a flowchart showing steps in using the hitch assist system 10 to align the vehicle hitch ball 26 with the trailer coupler 16 is shown, according to some examples. In particular, in step 146, the hitch assist system 10 is initiated. In some examples, the hitch assist system 10 can be initiated at any point when the coupler 16 is in the field of view 46, 48, 50, 52 of at least one imager 38, 40, 42, 44 within imaging system 36. Accordingly, once the hitch assist system 10 is initiated, the controller 14 can use imaging system 36 to scan the viewable scene using any or all available imagers 38, 40, 42, 44 (step 148). The scene scan (step 148) can create the image patch 54 that may be used to then identify the coupler 16 and, optionally, the associated trailer 18, which may be confirmed by the user (step 150). While the scene is scanned (step 148), the hitch assist system 10 also scans the hitch assembly 22 that is operably coupled with the vehicle 12. As provided herein, the memory 126 of the controller 14 may store various characteristics of recognized hitch assemblies, including the length of the ball mount 24 and/or the height $H_{hb}$ of the hitch ball 26. Once the imaging system 36 detects the hitch assembly 22, the hitch assist system 10 will determine if the hitch assembly 22 is recognized (step 152) thereby having the characteristics of that hitch assembly 22 stored in the memory 126 or if the hitch assembly 22 is newly installed on the vehicle 12 or is unrecognized.

If the various characteristics of the hitch assembly 22 are not stored in the memory 126, the user may be notified to rotate the tailgate 32 to the second position (step 154), as provided herein, if the tailgate 32 is not already disposed in such a position. As discussed above, the tailgate 32 may be manually and/or automatically disposed in the second position (step 154). Then, the length of the ball mount $L_{bm}$ and the height $H_{hb}$, can then be determined using the available image data 56 (step 156) as discussed above, including using the image processing routine 58. The new hitch assembly data may then be stored in the memory 126 of the controller 14 for later auto hitch operations utilizing the same hitch assembly 22.

Once the hitch assembly 22 characteristics are determined, and possibly stored in the memory 126 of the controller 14, a height, distance, and offset angle of the coupler 16 can also be determined using the available image data 56 (step 158), including using image processing routine 58. After the results of the initial scene scan (step 148) are analyzed (steps 150-158), the controller 14 can also determine if coupler 16 has been confirmed by the user (such as by way of the HMI 114). If the coupler 16 has not been confirmed or if the determined coupler 16 has been rejected, the scene scan (step 148) can be continued, including while instructing the user U to move the vehicle 12 to better align with the trailer 18, until the coupler 16 is identified.

When the coupler 16 has been identified and confirmed, the image processing routine 58 may determine a height of the coupler 16 (step 160). Such a comparison may function to verify that alignment of the coupler 16 over the hitch ball 26 is possible. The height of the coupler 16 may be calculated through any known method, such as those described in commonly-assigned U.S. patent application Ser. No. 15/708,463, filed Sep. 19, 2017, and entitled "HITCH ASSIST SYSTEM WITH HITCH COUPLER IDENTIFICATION FEATURE AND HITCH COUPLER HEIGHT ESTIMATION"; U.S. patent application Ser. No. 15/708,427, filed Sep. 19, 2017, and entitled "HITCH ASSIST SYSTEM WITH HITCH COUPLER IDENTIFICATION FEATURE AND HITCH COUPLER HEIGHT ESTIMATION"; U.S. patent application Ser. No. 15/628,062, filed Jun. 20, 2017, and entitled "VEHICLE REAR OBJECT PROXIMITY SYSTEM USING MULTIPLE IMAGERS"; U.S. patent application Ser. No. 15/724,760, filed Oct. 4, 2017, and entitled "HITCH ASSIST SYSTEM FOR CORRECTING MISALIGNMENT BETWEEN A TOW HITCH OF A VEHICLE AND A HITCH COUPLER OF A TRAILER"; U.S. patent application Ser. No. 15/902,051, filed Feb. 22, 2018, and entitled "HITCH ASSIST SYSTEM WITH TRAILER HEIGHT ESTIMATION AND HITCH COUPLER IDENTIFICATION"; U.S. patent application Ser. No. 15/802,831, filed Nov. 3, 2017, and entitled "COMPENSATION FOR TRAILER COUPLER HEIGHT IN AUTOMATIC HITCH OPERATION," the entire disclosures of which are incorporated by reference herein.

If the hitch ball 26 height is greater than the coupler height (step 162), the auto hitch operation may be paused and a notification may be provided to the user U through the vehicle alert system 106, which may prompt visual, auditory, and tactile warnings. For instance, vehicle brake lights 108 and vehicle emergency flashers may provide a visual alert and the vehicle horn 110 and/or the speaker 112 may provide an audible alert. Additionally, the controller 14 and/or vehicle alert system 106 may communicate with the HMI 114 of the vehicle 12. When a user restarts the auto hitch operation, the coupler height may again be determined (step 160) to verify that the coupler 16 is at a height that is greater than the height of the hitch ball 26.

If the coupler height is greater than the hitch ball height $H_{hb}$, the path derivation routine 128 can be used to determine the vehicle path 20 to align the hitch ball 26 with the coupler 16 (step 164). In this manner, the controller 14 uses the path derivation routine 128 to determine the path 20 to align the hitch ball 26 with the coupler 16 in an overlapping position over hitch ball 26. Once the path 20 has been derived, the hitch assist system 10 can ask the user U to relinquish control of at least the steering wheel 88 of vehicle 12 (and, optionally, the throttle 100 and brake, in various implementations of the hitch assist system 10 wherein the controller 14 assumes control of the powertrain control system 98 and the brake control system 96 during execution of the operating routine 130) while the vehicle performs an auto hitch operation (step 166). When it has been confirmed that user U is not attempting to control steering system 80 (for example, using the torque sensor 94), the controller 14 begins to move vehicle 12 along the determined path 20. Furthermore, the hitch assist system 10 may determine if the transmission system 102 is in the correct gear and may shift to the desired gear or prompt the user U to shift to the desired gear. The hitch assist system 10 may then control the steering system 80 to maintain the vehicle 12 along the path 20 as either the user U or the controller 14 controls the velocity of vehicle 12 using the powertrain control system 98 and the braking control system 96. As discussed herein, the controller 14 or the user U can control at least the steering system 80, while tracking the position of the coupler 16 until the vehicle 12 reaches the endpoint 132, wherein the vehicle hitch ball 26 reaches the desired position 140 for the desired alignment with the coupler 16, at which point the operating routine 130 can end (step 168).

Figure 11:
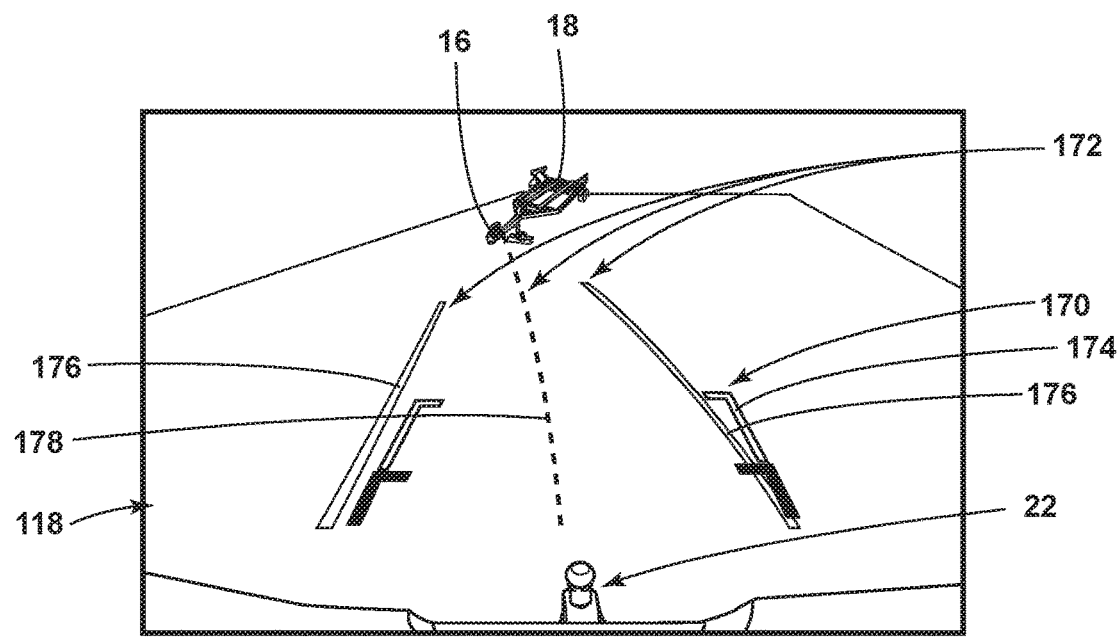
FIG. 11 is an image provided on a display presenting an area rearwardly of the vehicle.
Figure 12:
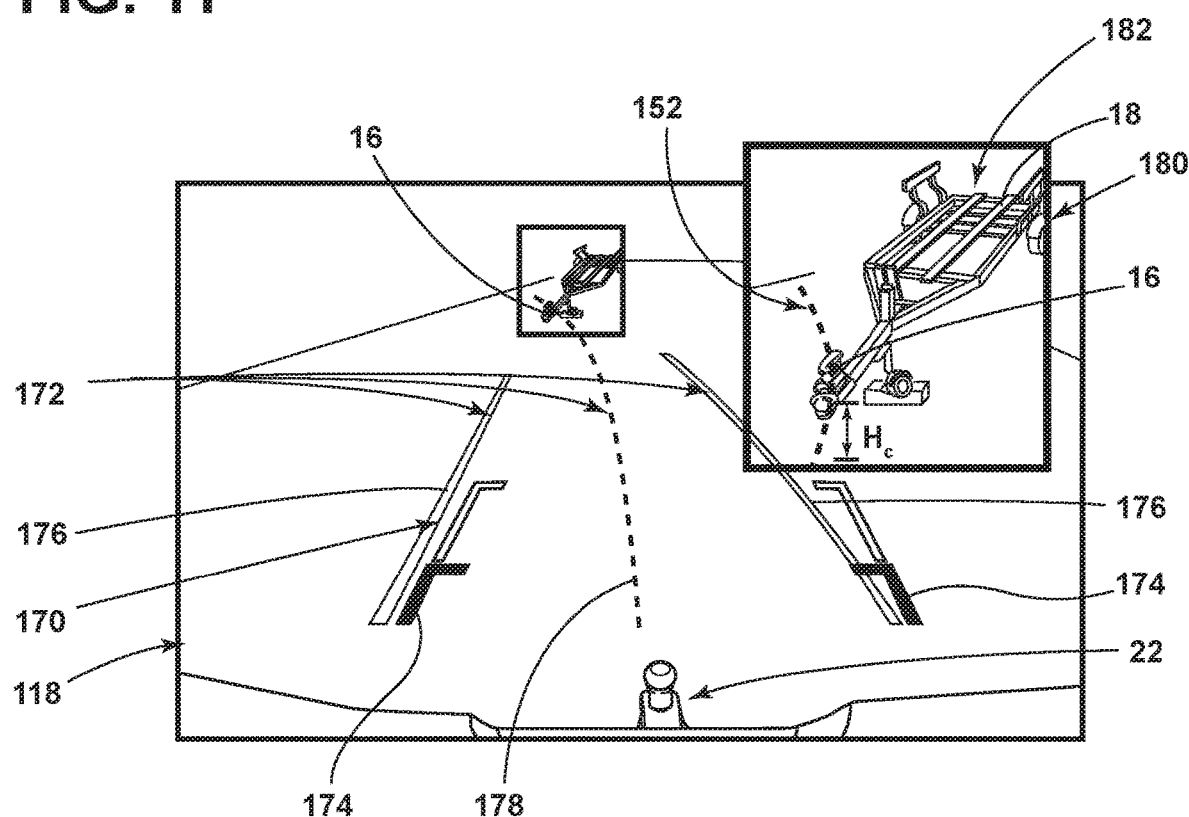
FIG. 12 is an image provided on a display presenting an area rearwardly of the vehicle and a zoom window generating a larger image of a portion of the displayed image.

Referring to FIGS. 11 and 12, in some instances, the hitch assist system 10 may allow driver interaction while the hitch assembly 22 approaches the coupler 16 of the trailer 18. For example, the user U may control any one or more of the steering system 80, the powertrain control system 98, and/or the braking control system 96. In some instances, as provided herein, when the transmission is placed in the reverse gear, the rear imager 40 operates in a backup assist or hitch assist mode for helping the user to back up to a designated target position. The image data 56 generated by the rear imager 40 creates the image patch 54 that is displayed on the display 118 within the vehicle 12 and/or on the display 118 of the portable device 122. An overlay 170 is presented to the user through the display 118, which may include a first set of dynamic and/or a second set of static locus lines 172, 174 to aid the user in maneuvering the vehicle 12 to a target, such as the coupler 16 of the trailer 18, and/or a parking spot. As the user U turns the steering wheel 88, the steering angle sensor 86 sends steering wheel angle data to the controller 14. The rear imager 40 and an image processor analyze the data from the steering wheel angle sensor, along with other vehicle data, which may include the gear ratio, wheel base size, wheel radius and vehicle speed data, and calculates a proper size and direction for the two sets of locus lines 172, 174 to be displayed as an overlay 170 in the displayed images.

The first set of locus lines 172 displayed have a direction that may be determined in response to a change in the steering wheel angle and other vehicle data related to wheelbase, radius, and gear ratio. In some instances, the first set of locus lines 172 may include a pair of peripheral lines 176 that illustrate the width of the vehicle 12 in a vehicle side-to-side direction and a central line 178 that defines a centerline of the vehicle in the side-to-side direction. The overlay 170 position of the first set of locus lines 172 depends on the turning radius and the current steering wheel angle of the vehicle 12, so the locus lines 172 will change as the steering wheel angle is changed. As the user and/or the hitch assist system 10 turns the steering wheel 88, each step and direction the steering wheel 88 moves is reflected in the first set of the locus line direction as displayed. Each time the steering angle δ changes, a replacement set of the first set of locus lines 172 is displayed. In this respect, the first set of locus lines 172 display a path 20 of the vehicle 12 so that the user gets a true sense of where the vehicle 12 is headed as they turn the steering wheel 88 and approach their desired destination.

As the steering wheel angle moves from a center position, not only the direction of the first set of locus lines 172 is adjusted but the length of the first set of locus lines 172 may also be adjusted accordingly. For example, as the steering wheel 88 is turned away from the center, the first set of locus line length may be increased. As the steering wheel 88 is turned towards the center, the first set of locus lines 172 may be decreased in length. For each change in steering wheel angle, the controller 14 recalculates and displays the first set of locus lines 172 at the updates the angle and length. At a maximum angle, either left or right of center, the locus lines 172 extend to a maximum length dimension. Accordingly, the first set of locus lines 172 provide the projected vehicle path 20 and a path 20 to the target. The user is given an indication of where the vehicle 12 is headed based on the steering wheel angle position and the vehicle wheelbase information.

In addition to the first set of locus lines 172, the second set of locus lines 174 may also be displayed. The second set of locus lines 174 may be fixed and provide the vehicle path 20 to a target. Unlike the first set of locus lines 172, the second set of locus lines 174 remain fixed in length and direction. In addition to the imager scene and the icons overlaid on the displayed image, textual instructions or prompts may also be provided on the display 118 or on a separate screen associated with the vehicle 12 (e.g., an instrument cluster display 118). The second set of locus lines 174 may also include various portions illustrated in various colors. In some examples, a first portion of the second set of locus lines 174 may be a first (e.g., red) color. A second portion may be separated from the vehicle 12 by the first portion and may be illustrated in a second (e.g., yellow) color. A third portion may be separated from the vehicle 12 by the first and second portions and be portrayed in a third (e.g., green) color.

Referring still to FIGS. 11 and 12, when the vehicle 12 is placed in reverse, a portion of the rear of the vehicle 12 (e.g., the bumper) and the surrounding area into which the backup maneuver will be performed may be displayed. The hitch assembly 22 extending rearwardly of the bumper is also visible. The image data 56 generated by the rear imager 40 may also include the trailer 18 that a user desired to couple to the vehicle 12. The trailer 18, and the coupler 16, may be identified through any method, such as those described in commonly-assigned U.S. patent application Ser. No. 15/708,463, filed Sep. 19, 2017, and entitled "HITCH ASSIST SYSTEM WITH HITCH COUPLER IDENTIFICATION FEATURE AND HITCH COUPLER HEIGHT ESTIMATION"; U.S. patent application Ser. No. 15/708,427, filed Sep. 19, 2017, and entitled "HITCH ASSIST SYSTEM WITH HITCH COUPLER IDENTIFICATION FEATURE AND HITCH COUPLER HEIGHT ESTIMATION"; U.S. patent application Ser. No. 15/628,062, filed Jun. 20, 2017, and entitled "VEHICLE REAR OBJECT PROXIMITY SYSTEM USING MULTIPLE IMAGERS"; U.S. patent application Ser. No. 15/701,644, filed Sep. 12, 2017, and entitled "HITCH ASSIST SYSTEM AND METHOD"; and U.S. patent application Ser. No. 15/802,831, filed Nov. 3, 2017, and entitled "COMPENSATION FOR TRAILER COUPLER HEIGHT IN AUTOMATIC HITCH OPERATION," the entire disclosures of which are incorporated by reference herein. Since the trailer 18 and/or the coupler 16 may be spaced apart from the vehicle 12 resulting in low resolution for visualization and identification of the coupler 16, a zoom window 180 is defined on the display 118 for enlarging a portion of the displayed image so that the driver can accurately identify the location of the coupler 16. The zoom window 180 may be manually defined by manipulating the touchscreen display 118 so that the zoom window 180 is placed over a point of interest (e.g., trailer 18) or automatically generated once the trailer 18 and/or coupler 16 is identified by the hitch assist system 10. In some examples, placement of the zoom window 180 may be performed by tapping opposite corners of the desired zoom window 180, tapping a first corner and then dragging the finger diagonally to define the zoom window 180 or using other techniques including those not requiring a touchscreen (such as using a mouse or trackball).

After defining the zoom window 180, the display 118 enlarges the area in the zoom window 180 as shown in FIG. 12, thereby providing a magnified image 182 so that the point of interest can be more accurately located. Thus, the magnified image 182 shows the trailer 18 and the coupler 16 at a larger scale. The central line 178 of the first set of locus lines 172 is centrally disposed in a vehicle side-to-side direction that aligns with the hitch assembly 22, which is also centrally disposed in a vehicle side-to-side direction. Thus, the central line 178 defines the projected position of the hitch assembly 22 in response to a change in the steering wheel angle and movement direction of the vehicle 12. The central line 178 may also be overlaid within the zoom window 180 such that the user may direct the vehicle 12 and/or ensure that the hitch assembly 22 will be aligned with the trailer 18, the coupler 16, and/or another point of interest upon completion of the auto hitch operation. The display 118 and/or the zoom window 180 may further include the distance between the vehicle 12 and the trailer 18 to improve the driver's perception for the vehicle maneuver. In some instances, once the vehicle 12 is within a predefined distance of the coupler 16, the zoom window 180 may be removed from the display 118.

A variety of advantages may be derived from the use of the present disclosure. For example, use of the disclosed hitch assist system provides a system for determining a height of a hitch assembly. The height may be compared to that of a trailer coupler to determine if the coupler may be engaged with the hitch assembly or if the hitch assembly or coupler should be adjusted. The hitch assist system may also provide any number of locus lines that help guide a user towards a desired target, such as the coupler. In some instances, a zoom window may be illustrated on the display that provides a higher degree of precision in reaching a desired vehicle position.

According to various examples, a hitch assist system is provided herein. The hitch assist system includes an imager for capturing one or more images of a hitch assembly and a trailer coupler. The imager is operably coupled with a movable panel, wherein the hitch assembly includes a ball mount and a hitch ball. A controller is configured to generate an image that includes the hitch assembly, identify the hitch assembly within the image, and estimate a ball mount length based on a predefined reference length. Examples of the hitch assist system can include any one or a combination of the following features:
    the movable panel forms a tailgate of a vehicle that is operably coupled to a body of the vehicle and the predefined reference length is a portion of the body;
    the imager is moved from a first position to a second position when the panel is moved from the first position to the second position, the second position rearwardly and downwardly of the first position;
    the imager is located on a rear of a vehicle and is disposed to capture one or more images of a rear-vehicle scene;
    the controller is further configured to determine a hitch ball height;
    the controller is further configured to estimate a height of the trailer coupler;
    the trailer coupler comprises a coupler ball socket;
    the controller further estimates a hitch ball height based on the ball mount length and projective geometry of the imager;
    the controller further determines a hitch ball height related to a ground surface based on the estimated ball mount length, a height of the imager, a focal length of the imager, a pitch of the imager, and a vertical distance between the imager and the hitch assembly; and/or
    a display configured to display the one or more images of the imager and overlay a central locus line disposed through the hitch assembly, the central locus line defining a direction of a vehicle and hitch assembly that is updated in response to a change in a steering wheel angle of the vehicle.

Moreover, a method of operating a hitch assist is provided herein. The method includes rotating a tailgate operably supporting an imager from a first position to a second position. The method also includes capturing one or more images of a hitch assembly with an imager. Further, the method includes estimating a ball mount length of the hitch assembly. Additionally, the method includes rotating the tailgate from the second position to the first. Lastly, the method includes estimating a hitch ball height based on the ball mount length and projective geometry of the imager. Examples of the hitch assist method can include any one or a combination of the following features:
    estimating a height of a trailer coupler;
    comparing the hitch ball height to the trailer coupler height;
    providing an alert if the hitch ball height is greater than the trailer coupler height;
    the hitch ball height comprises a height of the hitch ball relative to a ground surface; and/or
    the height of the trailer coupler comprises a height of the hitch coupler relative to a ground surface, and wherein the coupler comprises a coupler ball socket.

According to some examples, a hitch assist system is provided herein. The hitch assist system includes an imager for capturing one or more images of a hitch assembly and a trailer coupler. The hitch assist system also includes a display generating a rear contextual view based on the one or more images. The hitch assists system further includes a controller for identifying the hitch assembly, identifying a trailer coupler, displaying an overlaid line on the display that extends through the hitch assembly, and displaying a zoom window of the trailer coupler and the overlaid line. Examples of the hitch assist system can include any one or a combination of the following features:
    the controller is further configured to determine a hitch ball height related to a ground surface based on an estimated ball mount length, a height of the imager, a focal length of the imager, a pitch of the imager, and a vertical distance between the imager and the hitch assembly;
    the overlaid line illustrates a direction of a vehicle and the hitch assembly that is updated in response to a change in a steering wheel angle of the vehicle; and/or the controller is further configured to estimate a trailer coupler height; compare a hitch ball height to the trailer coupler height; and provide an alert if the hitch ball height is greater than the trailer coupler height.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It will be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It will be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A hitch assist system for a vehicle, comprising:
an imager for capturing one or more images of a hitch assembly and a trailer coupler, the imager operably coupled with a tailgate of the vehicle that is operably coupled to a body of the vehicle, wherein the hitch assembly includes a ball mount and a hitch ball; and
a controller configured to generate an image that includes the hitch assembly and a portion of the body of the vehicle, identify the hitch assembly within the image, and estimate a ball mount length based on a predefined reference length, wherein the predefined reference length is a length of the portion of the body of the vehicle included in the image generated by the controller.

2. The hitch assist system of claim 1, wherein the imager is moved from a first position to a second position when the tailgate is moved from the first position to the second position, the second position rearwardly and downwardly of the first position.

3. The hitch assist system of claim 1, wherein the imager is located on a rear of a vehicle and is disposed to capture one or more images of a rear-vehicle scene.

4. The hitch assist system of claim 1, wherein the controller is further configured to determine a hitch ball height.

5. The hitch assist system of claim 1, wherein the controller is further configured to estimate a height of the trailer coupler.

6. The hitch assist system of claim 1, wherein the trailer coupler comprises a coupler ball socket.

7. The hitch assist system of claim 1, wherein the controller further estimates a hitch ball height based on the ball mount length and projective geometry of the imager.

8. The hitch assist system of claim 7, wherein the controller further determines a hitch ball height related to a ground surface based on the estimated ball mount length, a height of the imager, a focal length of the imager, a pitch of the imager, and a vertical distance between the imager and the hitch assembly.

9. The hitch assist system of claim 1, further comprising:
a display configured to display the one or more images of the imager and overlay a central locus line disposed through the hitch assembly, the central locus line defining a direction of a vehicle and hitch assembly that is updated in response to a change in a steering wheel angle of the vehicle.

10. A hitch assist method comprising the steps of:
rotating a tailgate operably supporting an imager from a first position to a second position;
capturing one or more images of a hitch assembly and a portion of a body of the vehicle with the imager;
estimating a ball mount length of the hitch assembly based on a comparison to a predefined reference length, wherein the predefined reference length is stored in memory and corresponds to a length of the portion of the body of the vehicle captured in the one or more images;
rotating the tailgate from the second position to the first; and
estimating a hitch ball height based on the ball mount length and projective geometry of the imager.

11. The hitch assist method of claim 10, further comprising:
estimating a height of a trailer coupler.

12. The hitch assist method of claim 11, further comprising:
comparing the hitch ball height to the trailer coupler height.

13. The hitch assist method of claim 12, further comprising:
providing an alert if the hitch ball height is greater than the trailer coupler height.

14. The hitch assist method of claim 10, wherein the hitch ball height comprises a height of the hitch ball relative to a ground surface.

15. The hitch assist method of claim 11, wherein the height of the trailer coupler comprises a height of the hitch coupler relative to a ground surface, and wherein the coupler comprises a coupler ball socket.

16. A hitch assist system for a vehicle comprising:
an imager for capturing one or more images of a hitch assembly and a trailer coupler;
a display generating a rear contextual view based on the one or more images; and
a controller for:
   identifying the hitch assembly;
   identifying a trailer coupler;
   displaying an overlaid line on the display that extends through the hitch assembly;
   displaying a zoom window of the trailer coupler and the overlaid line;
   estimating a ball mount length based on a comparison of the hitch assembly identified in the in the one or more images and a reference length stored in memory that corresponds to at least a portion of a component of the vehicle identified in the one or more images; and
   determining a hitch ball height related to a ground surface based on the estimated ball mount length, a height of the imager, a focal length of the imager, and a vertical distance between the imager and the hitch assembly.

17. The hitch assist system of claim 16, wherein the overlaid line illustrates a direction of a vehicle and the hitch assembly that is updated in response to a change in a steering wheel angle of the vehicle.

18. The hitch assist system of claim 16, wherein the controller is further configured to estimate a trailer coupler height; compare a hitch ball height to the trailer coupler height; and provide an alert if the hitch ball height is greater than the trailer coupler height.

* * * * *